(12) United States Patent
Tu et al.

(10) Patent No.: US 8,165,744 B2
(45) Date of Patent: Apr. 24, 2012

(54) METHODS, PROGRAM PRODUCTS, AND SYSTEMS FOR CONTROLLING FOR IMPROPER INSTALLATION OF VEHICLE SENSORS

(75) Inventors: Thomas H. Tu, Troy, MI (US); Steven R. Abram, Ortonville, MI (US); Paul S. Shaub, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1071 days.

(21) Appl. No.: 12/051,714

(22) Filed: Mar. 19, 2008

(65) Prior Publication Data

US 2009/0240393 A1  Sep. 24, 2009

(51) Int. Cl.
*B62D 15/02* (2006.01)
*G05B 1/00* (2006.01)

(52) U.S. Cl. .......... 701/29.7; 701/43; 702/104; 702/116

(58) Field of Classification Search .................... 701/34, 701/41, 43; 702/104, 116
See application file for complete search history.

(56) References Cited

U.S. PATENT DOCUMENTS 6,158,826 A * 12/2000 Yasuda ......................... 303/191
6,519,515 B1 * 2/2003 Baumann et al. ............... 701/34
* cited by examiner

*Primary Examiner* — Eric Culbreth
*Assistant Examiner* — Keith Frisby
(74) *Attorney, Agent, or Firm* — Ingrassia Fisher & Lorenz, P.C.

(57) ABSTRACT

A method for controlling for improper installation of sensors of a vehicle is provided. The method comprises the steps of determining a first indication of direction based at least in part on a yaw value, determining a second indication of direction based at least in part on a steering angle value, and changing the second indication of direction, if the first indication of direction and the second indication of direction are inconsistent with one another.

17 Claims, 4 Drawing Sheets

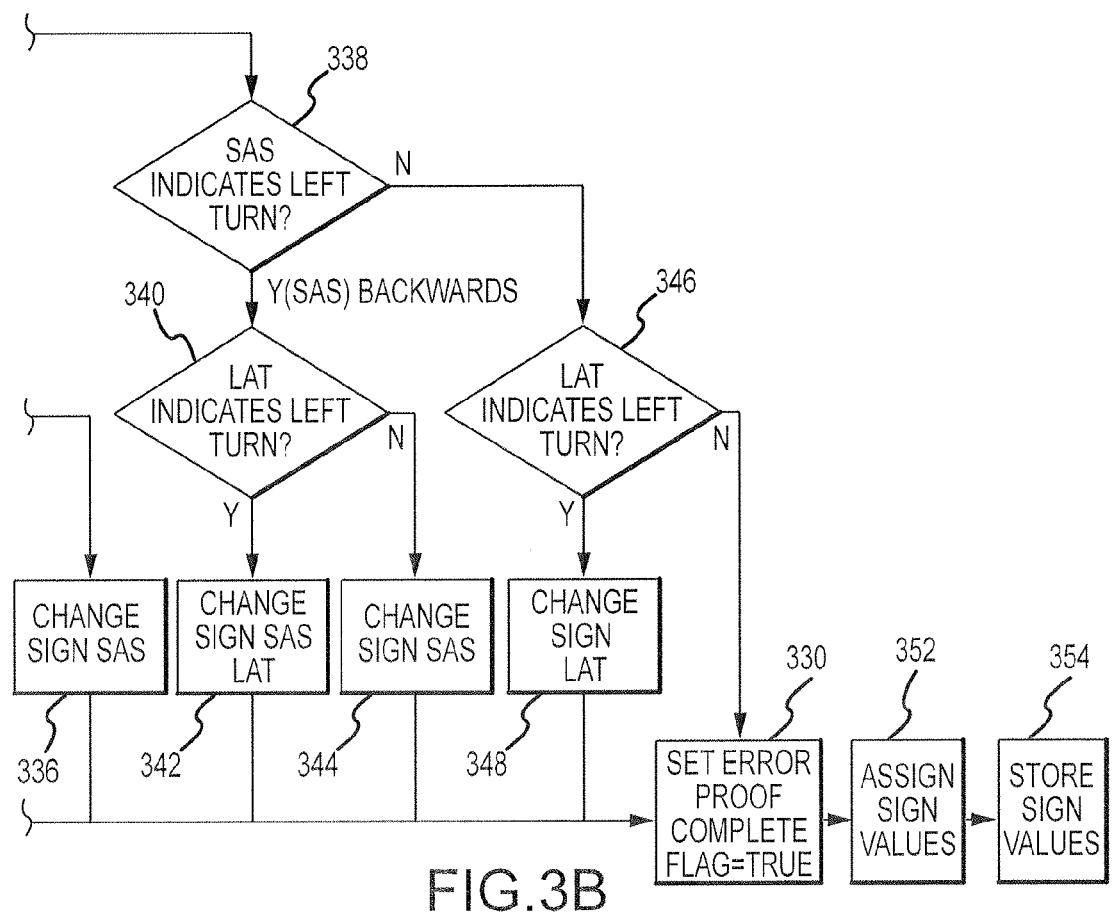

METHODS, PROGRAM PRODUCTS, AND SYSTEMS FOR CONTROLLING FOR IMPROPER INSTALLATION OF VEHICLE SENSORS

TECHNICAL FIELD

The present invention generally relates to vehicle sensors, and more particularly relates to methods, program products, and systems for controlling for improper installation of vehicle sensors.

BACKGROUND

Today's automobiles and other vehicles generally include a number of vehicle sensors for determining values of various vehicle parameters and variables. For example, today's vehicles often include an inertial sensor unit having one or more inertial sensors configured to determine yaw rate and lateral acceleration values, among various other values. Today's vehicles often also include a steering angle sensor unit having one or more steering angle sensors configured to determine values of a steering angle of the vehicle. While these and other sensors are generally quite effective in providing such values and other information, it can be difficult to control for improper installation of such sensors.

Accordingly, it is desirable to provide an improved method for controlling for improper installation of vehicle sensors, for example when one or more inertial sensors or steering angle sensors are installed backwards in the vehicle. It is also desirable to provide an improved program product for controlling for improper installation of vehicle sensors, for example when one or more inertial sensors or steering angle sensors are installed backwards in the vehicle. It is further desirable to provide an improved system for controlling for improper installation of vehicle sensors, for example when one or more inertial sensors or steering angle sensors are installed backwards in the vehicle. Other desirable features and characteristics will become apparent from the subsequent detailed description and the appended claims, taken in conjunction with the accompanying drawings and the foregoing technical field and background.

SUMMARY

In accordance with an exemplary embodiment of the present invention, a method for controlling for improper installation of sensors of a vehicle is provided. The method comprises the steps of determining a first indication of direction based at least in part on a yaw value, determining a second indication of direction based at least in part on a steering angle value, and changing the second indication of direction, if the first indication of direction and the second indication of direction are inconsistent with one another.

In accordance with another exemplary embodiment of the present invention, a program product for controlling for improper installation of sensors of a vehicle is provided. The program product comprises a program and a computer-readable signal. The program is configured to at least facilitate determining a first indication of direction based at least in part on a yaw value, determining a second indication of direction based at least in part on a steering angle value, and changing the second indication of direction, if the first indication of direction and the second indication of direction are inconsistent with one another. The computer-readable signal bearing media bears the program.

In accordance with a further exemplary embodiment of the present invention, a system for controlling for improper installation of sensors of a vehicle is provided. The system comprises an inertial sensor unit, a steering angle sensor unit, and a control unit. The inertial sensor unit is configured to at least facilitate generating a yaw value. The steering angle sensor unit is configured to at least facilitate generating a steering angle value. The control unit is configured to at least facilitate determining a first indication of direction based at least in part on the yaw value, determining a second indication of direction based at least in part on the steering angle value, and changing the second indication of direction, if the first indication of direction and the second indication of direction are inconsistent with one another.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
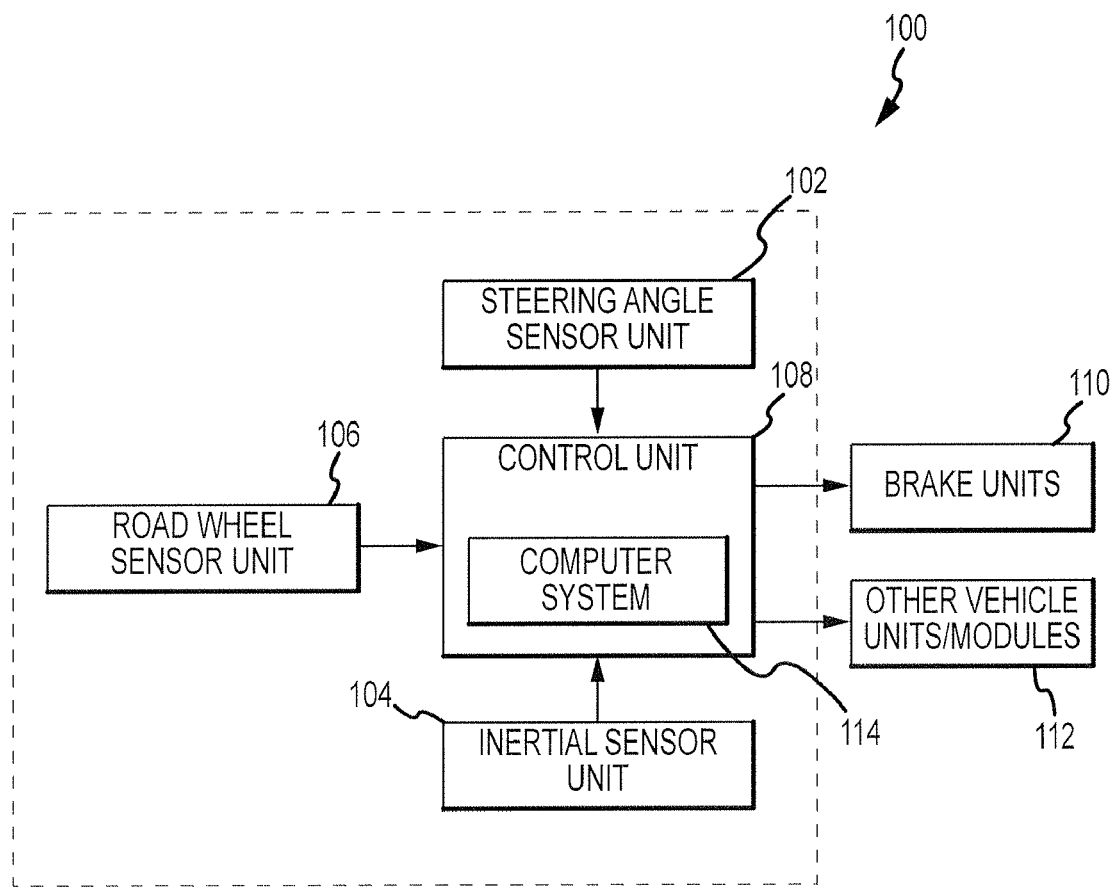
FIG. 1 is a simplified functional block diagram of a control system for controlling for improper installation of vehicle sensors, in accordance with an exemplary embodiment of the present invention.

FIG. 1 is a simplified functional block diagram of a control system 100 for controlling for improper installation of vehicle sensors, in accordance with an exemplary embodiment of the present invention. As depicted in FIG. 1, the control system 100 includes a steering angle sensor unit 102, an inertial sensor unit 104, a road wheel sensor unit 106, and a control unit 108. The control system 100 can be used in connection with an electronic stability control (ESC) system for a motor vehicle in certain embodiments; however, this may vary.

The steering angle sensor unit 102 determines values of a steering angle for the vehicle, and provides these values either directly or indirectly to the control unit 108. In one preferred embodiment, the steering angle sensor unit 102 includes one or more steering angle position sensors that are coupled either directly or indirectly to a non-depicted steering wheel of the vehicle and that determine the values of steering angle of the vehicle. Also in a preferred embodiment, the steering angle sensor unit 102 includes and/or is coupled to one or more transmitters for transmitting the steering angle values to the control unit 108. Preferably, the values of the steering angle determined by the steering angle sensor unit 102 each include a magnitude and a sign for the steering angle. The sign of the steering angle preferably represents a direction of the steering angle, which in turn represents a position and/or direction of turning for the vehicle. The steering angle sensor unit 102 may also obtain and/or transmit other values pertaining to the vehicle.

The inertial sensor unit 104 determines values of a yaw rate and a lateral acceleration for the vehicle, and provides these values either directly or indirectly to the control unit 108. In one preferred embodiment, the inertial sensor unit 104 includes one or more inertial sensors disposed inside the vehicle that determine the values of yaw rate and lateral acceleration for the vehicle. Also in a preferred embodiment, the inertial sensor unit 104 includes and/or is coupled to one or more transmitters for transmitting the yaw rate and lateral acceleration values to the control unit 108. Preferably, the values of yaw rate and lateral acceleration determined by the inertial sensor unit 104 each include a magnitude and a sign. Each sign of these values preferably represents a direction thereof, which in turn represents a position and/or direction of turning for the vehicle. The inertial sensor unit 104 may also obtain and/or transmit other values pertaining to the vehicle, such as vehicle longitudinal acceleration values, among other possible values.

The road wheel sensor unit 106 determines one or more values of road wheel movement measures, such as a direction of road wheel movement and a road wheel slip measure, and provides these values either directly or indirectly to the control unit 108. In one preferred embodiment, the road wheel sensor unit 106 includes one or more road wheel sensors coupled to one or more non-depicted road wheels of the vehicle and configured to determine the values of the road wheel movement measures, such as those described above, among others. Also in a preferred embodiment, the road wheel sensor unit 106 includes and/or is coupled to one or more transmitters for transmitting the values of road wheel movement measures to the control unit 108. Preferably, the values determined by the road wheel sensor unit 106 each include a magnitude and a sign. Each sign of these values preferably represents a direction thereof, which in turn represents a position and/or direction of turning for the vehicle. The road wheel sensor unit 106 may also obtain and/or transmit other values pertaining to the vehicle. In one preferred embodiment, the road wheel sensor unit 106 comprises four independent wheel speed sensors that directly measure road wheel speed, and which can then be used to calculate wheel slip and/or other values indirectly based off of these measurements for road wheel speed. However, this may vary in other embodiments.

Figure 3A:
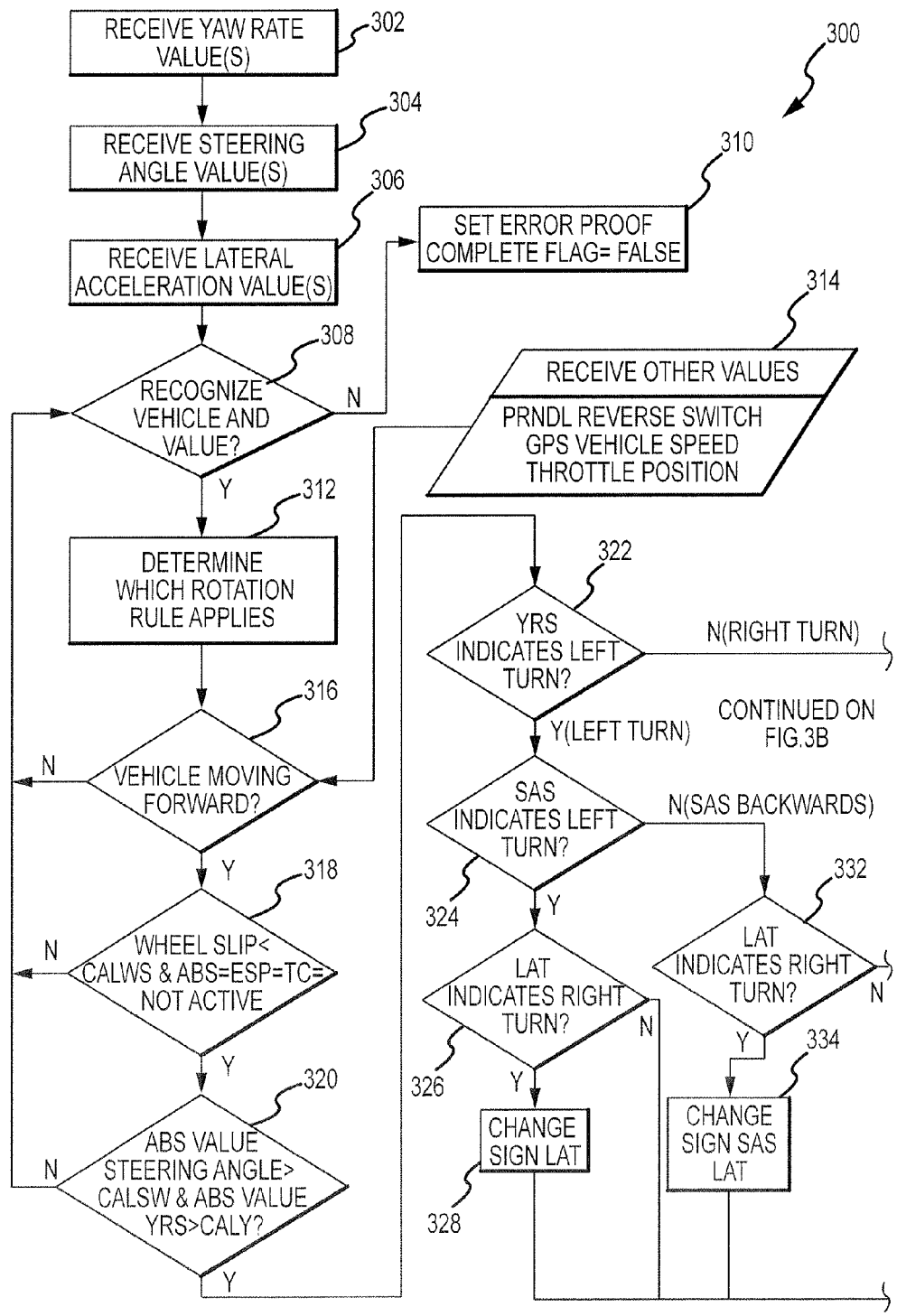
FIG. 3 is a flowchart of a process for controlling for improper installation of vehicle sensors that can be used in connection with the control system of FIG. 1 and the computer system of FIG. 2, in accordance with an exemplary embodiment of the present invention.

The control unit 108 receives the steering angle values from the steering angle sensor unit 102, the values of a yaw rate and lateral acceleration from the inertial sensor unit 104, and the values of the road wheel movement measures from the road wheel sensor unit 106, and performs various functions based at least in part on these values. In particular, the control unit 108 determines whether or not sensors of the steering angle sensor unit 102 and the inertial sensor unit 104 are installed correctly, and controls for any incorrect installation. The control unit 108 makes appropriate adjustments to these values as appropriate, for example if one or more sensors of the steering angle sensor unit 102 and/or the inertial sensor unit 104 are installed backwards. An exemplary embodiment of a control process for performing such functions is depicted in the flowchart of FIG. 3, and will be described in greater detail further below in connection therewith. In addition, the control unit 108 utilizes values and information obtained from the steering angle sensor unit 102, the inertial sensor unit 104, the road wheel sensor unit 106, and/or other non-depicted sources for controlling the vehicle and/or various components thereof, for example by influencing brake units 110 and/or other vehicle units and/or modules 112 as depicted in FIG. 1.

In a preferred embodiment, the control unit 108 includes and/or is coupled to one or more receivers for receiving the steering angle values from the steering angle sensor unit 102, the values of a yaw rate and lateral acceleration from the inertial sensor unit 104, the values of road wheel movement measures from the road wheel sensor unit 106, and/or other values and information from these and/or other sources. Also in a preferred embodiment, the control unit 108 includes a computer system 114 that at least facilitates analyzing the values and information obtained from the steering angle sensor unit 102, the inertial sensor unit 104, the road wheel sensor unit 106, and/or other non-depicted sources, determining whether or not sensors of the steering angle sensor unit 102 and/or the inertial sensor unit 104 are installed correctly, controlling for any incorrect installation for example via the exemplary embodiment of the control process depicted in FIG. 3, and controlling the vehicle and/or various components thereof.

An exemplary embodiment of such a computer system 114 will be discussed below in connection with FIG. 2. However, it will be appreciated that, in various other embodiments, the control unit 108 may include more than one computer system 114 and/or may utilize one or more computer systems 114 from one or more other non-depicted systems or units. It will similarly be appreciated that the control unit 108 can utilize any number of different types of computer systems and/or other devices or systems in various embodiments.

Figure 2:
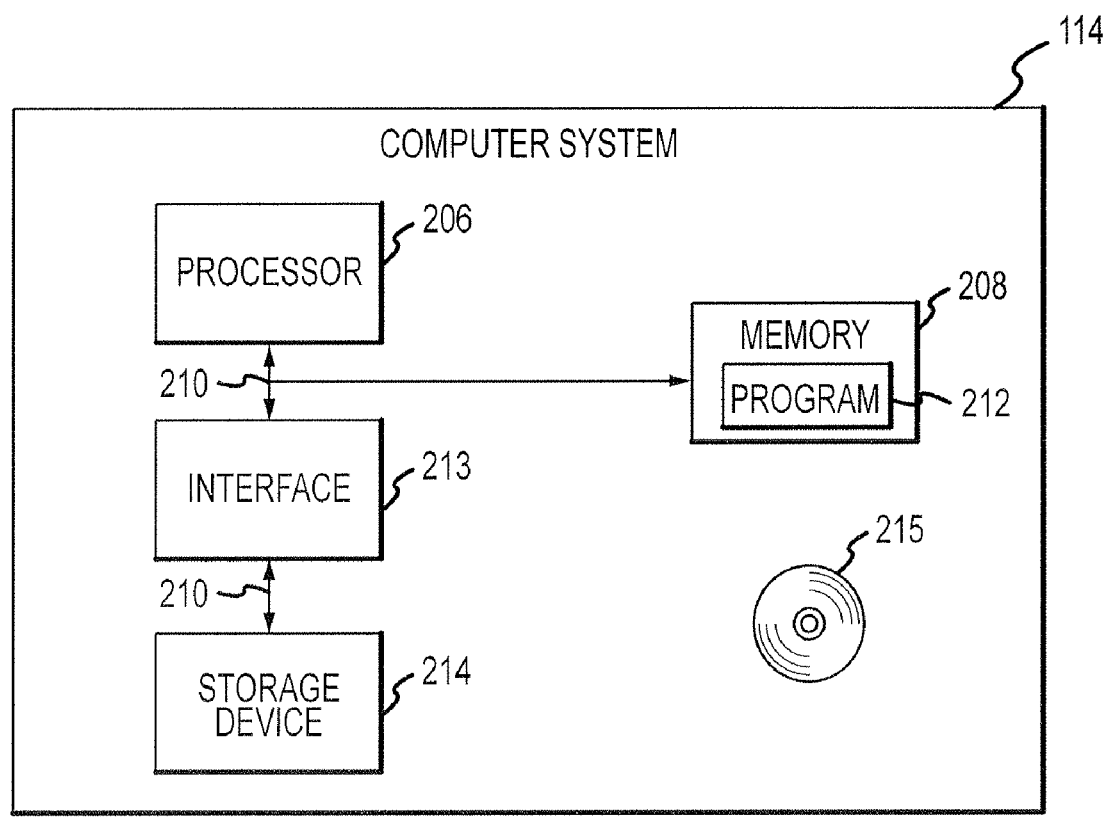
FIG. 2 is a simplified functional block diagram of a computer system of the control system of FIG. 1, in accordance with an exemplary embodiment of the present invention.

FIG. 2 is a simplified functional block diagram of the computer system 114 of FIG. 1 in accordance with an exemplary embodiment of the present invention. In the embodiment depicted in FIG. 2, the computer system 114 includes a processor 206, a memory 208, a computer bus 210, an interface 213, and a storage device 214. The processor 206 performs the computation and control functions of the control system 100 and the control unit 108 of FIG. 1, and may comprise any type of processor or multiple processors, single integrated circuits such as a microprocessor, or any suitable number of integrated circuit devices and/or circuit boards working in cooperation to accomplish the functions of a processing unit. During operation, the processor 206 executes one or more programs 212 preferably stored within the memory 208 and, as such, controls the general operation of the computer system 114, and, preferably also the general operation of the control system 100 and the control unit 108.

The memory 208 stores a program or programs 212 that executes one or more embodiments of a control process such as that described further below in connection with FIG. 3, and/or various steps thereof and/or other processes, such as those described elsewhere herein. The memory 208 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 208 may be a single type of memory component, or it may be composed of many different types of memory components. In addition, the memory 208 and the processor 206 may be distributed across several different computers that collectively comprise the computer system 114. For example, a portion of the memory 208 may reside on a computer within a particular apparatus or process, and another portion may reside on a remote computer.

The computer bus 210 serves to transmit programs, data, status and other information or signals between the various components of the computer system 114. The computer bus 210 can be any suitable physical or logical means of connecting computer systems and components. This includes, but is not limited to, direct hard-wired connections, fiber optics, infrared and wireless bus technologies.

The interface 213 allows communication to the computer system 114, for example from a system operator and/or another computer system, and can be implemented using any suitable method and apparatus. It can include one or more network interfaces to communicate with the steering angle sensor unit 102, the inertial sensor unit 104, the road wheel sensor unit 106, any non-depicted components of the control unit 108, the brake units 110, and/or the other vehicle units/modules 112 of FIG. 1, and/or within or to other systems or components, one or more terminal interfaces to communicate with technicians, and one or more storage interfaces to connect to storage apparatuses such as the storage device 214.

The storage device 214 can be any suitable type of storage apparatus, including direct access storage devices such as hard disk drives, flash systems, floppy disk drives and optical disk drives. In one exemplary embodiment, the storage device 214 is a program product from which memory 208 can receive a program 212 that executes one or more embodiments of processes such as the control process described below in connection with FIG. 3 and/or steps thereof. In one preferred embodiment, such a program product can be implemented as part of, inserted into, or otherwise coupled to the computer system 114 of the control unit 108 of the control system 100 of FIG. 1. As shown in FIG. 2, the storage device 214 can comprise a disk drive device that uses disks 215 to store data. As one exemplary implementation, the computer system 114 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 215), and transmission media such as digital and analog communication links. It will similarly be appreciated that the computer system 114 may also otherwise differ from the embodiment depicted in FIG. 2, for example in that the computer system 114 may be coupled to or may otherwise utilize one or more remote computer systems and/or other control systems.

FIG. 3 is a flowchart of a control process 300 for controlling for improper installation of vehicle sensors, in accordance with an exemplary embodiment of the present invention. In the depicted embodiment, the control process 300 can be used in connection with the control system 100 of FIG. 1 and the computer system 114 of FIGS. 1 and 2. The control process 300 can be used in connection with an electronic stability control (ESC) system for a motor vehicle in certain embodiments; however, this may vary.

As depicted in FIG. 3, the control process 300 begins with the step of receiving one or more yaw rate values pertaining to the vehicle (step 302). In a preferred embodiment, the yaw rate values are received by the control unit 108 of FIG. 1, for example by one or more receivers thereof, from the inertial sensor unit 104 of FIG. 1, for example by one or more transmitters thereof. The yaw rate values will be used in determining whether or not any sensors are installed improperly, and in controlling the vehicle and/or various components thereof. This step 302 may continually repeat over time as new yaw rate values are obtained and/or updated at different points in time.

One or more steering angle values pertaining to the vehicle are also obtained (step 304). In a preferred embodiment, the steering angle values are received by the control unit 108 of FIG. 1, for example by one or more receivers thereof, from the steering angle sensor unit 102 of FIG. 1, for example by one or more transmitters thereof. The steering angle values will be used in determining whether or not any sensors are installed improperly, and in controlling the vehicle and/or various components thereof. This step 304 may continually repeat over time as new steering rate values are obtained and/or updated at different points in time.

One or more lateral acceleration values pertaining to the vehicle are also obtained (step 306). In a preferred embodiment, the lateral acceleration values are received by the control unit 108 of FIG. 1, for example by one or more receivers thereof, from the inertial sensor unit 104 of FIG. 1, for example by one or more transmitters thereof. The lateral acceleration values will be used in determining whether or not any sensors are installed improperly, and in controlling the vehicle and/or various components thereof. This step 306 may continually repeat over time as new lateral acceleration values are obtained and/or updated at different points in time. It will be appreciated that steps 302, 304, and 306, and/or various other steps of the control process 300, may be conducted continuously, simultaneously, or in any one or more different orders, regardless of the order depicted in FIG. 3 and/or described herein in connection therewith.

In addition, a determination is made as to whether the vehicle is recognized (step 308). In a preferred embodiment, this determination, and the various other determinations and actions of the control process 300, are performed by the computer system 114 of the control unit 108 of FIGS. 1 and 2, preferably by a processor 206 and/or a program 212 thereof, for example as depicted in FIG. 2 above. Specifically, in a preferred embodiment, this determination entails whether or not the vehicle is recognized with respect to which rotation rule the vehicle uses for values such as steering angle, yaw rate, and lateral acceleration.

If a determination is made in step 308 that the vehicle is not recognized, then the process proceeds to step 310, in which an Error Proof Complete Flag is set to a "false" condition value, after which the process terminates. For example, in one preferred embodiment, the Error Proof Complete Flag is set equal to zero in step 310 to indicate this false condition value; however, this may vary in other embodiments. When the Error Proof Flag is set equal to the false condition value, this provides an indication that the control process 300 cannot successfully detect whether or not the sensors are installed correctly on this vehicle. The Error Proof Complete Flag is preferably set by the computer system 114 of the control unit 108 of FIGS. 1 and 2, preferably by a processor 206 and/or a program 212 thereof.

Conversely, if a determination is made in step 308 that the vehicle is recognized, then the process proceeds instead to step 312, in which a determination is made as to which rotation rule applies for the vehicle for values such as steering angle, yaw rate, and lateral acceleration. This determination is preferably made by the computer system 114 of the control unit 108 of FIGS. 1 and 2, preferably by a processor 206 and/or a program 212 thereof.

In addition, one or more additional values are preferably received (step 314). These additional values preferably include a direction of road wheel movement, a road wheel slip value, a gear or PRNDL position value, a reverse switch position value, a global position system (GPS) value, a vehicle speed value, a throttle position value, and/or other values. In a preferred embodiment, these values are received by the control unit 108 of FIG. 1, for example by one or more receivers thereof, from the road wheel sensor unit 106, for example from a transmitter thereof, and/or from various other sources.

A determination is then made as to whether or not the vehicle is moving forward (step 316). This determination is preferably made by the computer system 114 of the control unit 108 of FIGS. 1 and 2, preferably by a processor 206 and/or a program 212 thereof, utilizing the values obtained in step 314. If a determination is made in step 316 that the vehicle is not moving forward, then the process returns to step 302 and the process restarts with a new iteration as new and/or updated yaw rate, steering angle, and lateral acceleration values are obtained at subsequent points in time until a determination is made in an iteration of step 316 that the vehicle is moving forward.

Once a determination is made in step 316 that the vehicle is moving forward, then the process proceeds to step 318, in which a determination is made as to whether the road wheel slip value (Wheel Slip) obtained in step 314 is less than a first predetermined threshold value (CalWS). This determination is preferably made by the computer system 114 of the control unit 108 of FIGS. 1 and 2, preferably by a processor 206 and/or a program 212 thereof, utilizing the values obtained in step 314.

If a determination is made in step 318 that the road wheel slip value is greater than or equal to the first predetermined threshold value, then the process returns to step 302 and the process restarts with a new iteration. New and/or updated yaw rate, steering angle, and lateral acceleration values are then obtained at subsequent points in time until a determination is made in an iteration of step 318 that the wheel slip value is less than the first predetermined threshold value.

Once a determination is made in step 318 that the road wheel slip value is less than the first predetermined threshold value, then the process proceeds to step 320, in which a determination is made as to whether (i) an absolute value of the steering angle is greater than a second predetermined threshold value (CalSW) and (ii) an absolute value of the yaw rate is greater than a third predetermined threshold value (CalY). This determination is preferably made by the computer system 114 of the control unit 108 of FIGS. 1 and 2, preferably by a processor 206 and/or a program 212 thereof, utilizing the values obtained in step 314.

If a determination is made in step 320 that either the absolute value of the steering angle is less than or equal to the second predetermined threshold value or the absolute value of the yaw rate is less than or equal to the third predetermined threshold value, or both, then the process returns to step 302. The process then restarts with a new iteration as new and/or updated yaw rate, steering angle, and lateral acceleration values are obtained at subsequent points in time until a determination is made in an iteration of step 320 that both the absolute value of the steering angle is greater than the second predetermined threshold value and the absolute value of the yaw rate is greater than the third predetermined threshold value.

Once a determination is made in step 320 that both the absolute value of the steering angle is greater than the second predetermined threshold value and the absolute value of the yaw rate is greater than the third predetermined threshold value, then the process proceeds to step 322, in which a determination is made as to an indication of direction of whether the yaw rate(s) received in step 302 indicate that the vehicle is making a left turn. In a preferred embodiment, this determination, as well as the other determinations of directions and indications thereof described below in connection with the process (for example, in steps 324, 326, 332, 338, 340, and 346 described further below), are preferably made by the computer system 114 of the control unit 108 of FIGS. 1 and 2, preferably by a processor 206 and/or a program 212 thereof, and are preferably made based on a sign (positive or negative) of the respective value(s), utilizing the rotation rule for the vehicle as determined in step 312.

If it is determined in step 322 that the yaw rate(s) indicate that the vehicle is making a left turn, then a determination is made as to an indication of direction of whether the steering angle value(s) received in step 304 also indicate that the vehicle is making a left turn (step 324). Otherwise, the process proceeds instead to step 338, as described further below.

If it is then determined in step 324 that the steering angle value(s) also indicate that the vehicle is making a left turn, then the yaw rate and the steering angle are deemed to be consistent with one another, and a further determination is then made as to an indication of direction of whether the lateral acceleration value(s) received in step 306 indicate that the vehicle is making a right turn (step 326). Otherwise, the process proceeds instead to step 332, as described further below.

If it is determined in step 326 that the lateral acceleration value(s) indicate that the vehicle is making a left turn, then the yaw rate, the steering angle, and the lateral acceleration are deemed to be consistent with another, and the sensors are deemed to be installed properly in the vehicle. Accordingly, in this event, no changes are made to any of these values, and the process proceeds directly to step 330. In step 330, the Error Proof Complete Flag is set to a "true" condition value, after which the control process 300 terminates. In one preferred embodiment, the Error Proof Complete Flag is set equal to one in step 330 to indicate this true condition value; however, this may vary in other embodiments. When the Error Proof Flag is set equal to the true condition value, this provides an indication that the control process 300 was able to successfully detect whether or not the sensors are installed correctly on this vehicle and to control for such installation accordingly, in the depicted embodiment.

Conversely, if is determined in step 326 that the lateral acceleration value(s) indicate that the vehicle is making a right turn, then the lateral acceleration is deemed to be inconsistent with both the yaw rate and the steering angle, and an inertial sensor or unit thereof of the vehicle responsible for determining lateral acceleration value(s) is deemed to be installed backwards. Accordingly, in this event, the sign of the lateral acceleration value(s) are changed (step 328), and the process then proceeds to the above-referenced step 330, in which the Error Proof Complete Flag is set to a "true" condition value, after which the control process 300 terminates.

As referenced above, if it is determined in step 324 that the steering angle value(s) indicate that the vehicle is making a right turn, then the process proceeds to step 332. In this event, the steering angle is deemed to be inconsistent with the yaw rate. Accordingly, in step 332, a determination is made as to an indication of direction of whether the lateral acceleration value(s) indicate that the vehicle is making a right turn. If it is determined in step 332 that the lateral acceleration value(s) indicate that the vehicle is making a right turn, then both the steering angle and the lateral acceleration are deemed to be inconsistent with the yaw rate, and therefore both a steering angle sensor or unit thereof and an inertial sensor or unit thereof of the vehicle responsible for determining values of steering angle and lateral acceleration, respectively, are deemed to be installed backwards. Accordingly, in this event, the sign of the lateral acceleration value and the steering angle value are both changed (step 334), and the process then proceeds to the above-referenced step 330, in which the Error Proof Complete Flag is set to a "true" condition value, after which the control process 300 terminates.

Conversely, if it is determined in step 332 that the lateral acceleration value(s) indicate that the vehicle is making a left turn, then the steering angle is deemed to be inconsistent with both the yaw rate and the lateral acceleration, and therefore a steering angle sensor or unit thereof responsible for determining steering angle value(s) is deemed to be installed backwards. Accordingly, in this event, the sign of the steering angle value(s) are changed (step 336), and the process then proceeds to the above-referenced step 330, in which the Error Proof Complete Flag is set to a "true" condition value, after which the control process 300 terminates.

As referenced above, if it is determined in step 322 that the yaw rate value(s) indicate that the vehicle is making a right turn, then the process proceeds to step 338. In step 338, a determination is made as to an indication of direction of whether the steering angle value(s) indicate that the vehicle is making a left turn. If it is then determined in step 338 that the steering angle value(s) indicate that the vehicle is making a left turn, then the yaw rate and the steering angle are deemed to be inconsistent with one another, and a further determination is then made as to an indication of direction of whether the lateral acceleration value(s) indicate that the vehicle is making a left turn (step 340). Otherwise, the process proceeds instead to step 346, as described further below.

If it is determined in step 340 that the lateral acceleration value(s) indicate that the vehicle is making a left turn, then both the steering angle and the lateral acceleration are deemed to be inconsistent with the yaw rate, and a steering angle sensor or unit thereof and an inertial sensor or unit thereof responsible for determining values of steering angle and lateral acceleration, respectively, are deemed to be installed backwards in the vehicle. Accordingly, in this event, the signs of the steering angle value(s) and the lateral acceleration value(s) are changed (step 342), and the process then proceeds to the above-referenced step 330, in which the Error Proof Complete Flag is set to a "true" condition value, after which the control process 300 terminates.

Conversely, if is determined in step 340 that the lateral acceleration value(s) indicate that the vehicle is making a right turn, then the steering angle is deemed to be inconsistent with both the yaw rate and the lateral acceleration, and a steering angle sensor or unit thereof responsible for determining steering angle value(s) is deemed to be installed backwards in the vehicle. Accordingly, in this event, the sign of the steering angle value(s) are changed (step 344), and the process then proceeds to the above-referenced step 330, in which the Error Proof Complete Flag is set to a "true" condition value, after which the control process 300 terminates.

As referenced above, if it is determined in step 338 that the steering angle value(s) indicate that the vehicle is making a right turn, then the process proceeds to step 346. In step 346, a determination is made as to an indication of direction of whether the lateral acceleration value(s) indicate that the vehicle is making a left turn.

If it is determined in step 346 that the lateral acceleration value(s) indicate that the vehicle is making a left turn, then the lateral acceleration is deemed to be inconsistent with both the yaw rate and the steering angle, and an inertial sensor or unit thereof responsible for determining lateral acceleration value (s) is deemed to be installed backwards in the vehicle. Accordingly, in this event, the sign of the lateral acceleration value(s) are changed (step 348), and the process then proceeds to the above-referenced step 330, in which the Error Proof Complete Flag is set to a "true" condition value, after which the control process 300 terminates.

Conversely, if is determined in step 346 that the lateral acceleration value(s) indicate that the vehicle is making a right turn, then the yaw rate, the steering angle, and the lateral acceleration are deemed to be consistent with another, and the sensors are deemed to be installed properly in the vehicle. Accordingly, in this event, the signs of the yaw rate(s), the steering angle value(s), and the lateral acceleration value(s) are unchanged, and the process then proceeds to the above-referenced step 330, in which the Error Proof Complete Flag is set to a "true" condition value, after which the control process 300 terminates.

In addition, in a preferred embodiment, one or more sign values are assigned to each indication of direction for the yaw rate(s), the steering angle(s), and the lateral acceleration(s) (step 352). Preferably a respective sign value is assigned to each of the indications of direction for the yaw rate(s), the steering angle(s), and the lateral acceleration(s) based at least in part on the indications of steps 322, 324, 326, 332, 338, 340, and 346 as well as any sign changes made in steps 328, 334, 336, 342, 344, and/or 348. In a preferred embodiment, the respective sign values are assigned by the control unit 108 of the control system 100 of FIG. 1, preferably by a computer system 114 thereof, and most preferably by a processor thereof, such as the processor 206 depicted in FIG. 2.

The respective sign values are then preferably stored for subsequent use in one or more control algorithms (step 354). For example, the sign values may be subsequently utilized in one or more main driving system control algorithms, either within the same drive cycle or in subsequent drive cycles. Also in a preferred embodiment, the sign values are stored in the computer system 114 of the control unit 108 of FIG. 1, most preferably in a memory thereof, such as the memory 208 depicted in FIG. 2. However, this may vary in other embodiments.

It will be appreciated that various steps of the control process 300 may vary from those depicted in FIG. 3 and/or described herein. For example, in certain embodiments, in steps 322-346, each of the determinations referenced in FIG. 3 as to a vehicle left turn may be switched to refer instead to a vehicle right turn, provided that each of the determinations referenced in FIG. 3 as to a vehicle right turn are likewise switched to refer instead to a vehicle left turn. In such an example, the determination in step 322 may be whether the yaw rate value(s) indicate that the vehicle is making a right turn, provided that the determinations of steps 324 and 338 are whether the steering angle value(s) indicate that the vehicle is making a right turn, the determinations of steps 326 and 332 are whether the lateral acceleration value(s) indicate that the vehicle is making a left turn, and the determinations of steps 340 and 342 are whether the lateral acceleration values indicate that the vehicle is making a right turn.

Various other changes to the steps of the control process 300 may also occur, for example depending on the rotational rule determined in step 312. For example, if one particular common version of a right hand rule is utilized, then each determination as to whether the vehicle is making a right turn may comprise a determination as to whether a sign of a particular value is positive, and each determination as to whether the vehicle is making a left turn may comprise a determination as to whether a sign of a particular value is negative. However, this may vary, for example depending on the embodiment of the invention and the particular rotation rule utilized in the vehicle. In addition, as noted above, various steps of the control process 300 may be performed continuously, simultaneously, and/or in a different order than that depicted in FIG. 3 and/or described herein.

Accordingly, a process, a system, and a program product are provided for improved detection and control for improper installation of sensors in a vehicle. For example, the disclosed process, system, and program products detect and control for improper installation of inertial sensors and steering angle sensors while the vehicle is being driven, and without the need to take apart the vehicle or to return the vehicle for servicing. The control system 100, the computer system 114, and the control process 300 can be implemented in connection with an electronic stability control (ESC) system for the vehicle in certain embodiments; however, they may also be applicable in connection with other devices and/or systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling for improper installation of sensors of a vehicle, the method comprising the steps of:
   determining whether the vehicle is moving forward;
   determining a first indication of direction based at least in part on a yaw value;
   determining a second indication of direction based at least in part on a steering angle value;
   determining whether the first indication of direction and the second indication of direction are inconsistent with one another; and
   changing the second indication of direction, if it is determined that the first indication of direction and the second indication of direction are inconsistent with one another, provided further that the vehicle is moving forward.

2. The method of claim 1, further comprising the steps of:
   determining a third indication of direction based at least in part on a lateral acceleration value; and
   changing the third indication of direction, if the first indication of direction and the third indication of direction are inconsistent with one another.

3. The method of claim 2, further comprising the steps of:
   determining whether the first indication of direction indicates that the vehicle is turning in one direction while the second indication of direction indicates that the vehicle is turning in another direction, to thereby determine whether the first indication of direction and the second indication of direction are inconsistent with one another; and
   determining whether the first indication of direction indicates that the vehicle is turning in one direction while the third indication of direction indicates that the vehicle is turning in another direction, to thereby determine whether the first indication of direction and the third indication of direction are inconsistent with one another.

4. The method of claim 3, further comprising the steps of:
   determining an applicable rotation rule;
   determining whether the first indication of direction and the second indication of direction are inconsistent with one another, based at least in part on the applicable rotation rule; and
   determining whether the first indication of direction and the third indication of direction are inconsistent with one another, based at least in part on the applicable rotation rule.

5. The method of claim 4, further comprising the steps of:
   determining whether the first indication of direction and the second indication of direction are inconsistent with one another, based also at least in part on a sign of the first indication of direction and a sign of the second indication of direction; and
   determining whether the first indication of direction and the third indication of direction are inconsistent with one another, based also at least in part on the sign of the first indication of direction and a sign of the third indication of direction.

6. The method of claim 3, further comprising the step of:
   changing the third indication of direction, only upon the further condition that the vehicle is moving forward.

7. The method of claim 6, further comprising the steps of:
   determining a wheel slip value;
   changing the second indication of direction, only upon the further condition that the wheel slip value is less than a predetermined value; and
   changing the third indication of direction, only upon the further condition that the wheel slip value is less than the predetermined value.

8. The method of claim 7, further comprising the steps of:
   determining a steering angle magnitude;
   determining a yaw rate magnitude;
   changing the second indication of direction, only upon the further conditions that the steering angle magnitude is greater than a second predetermined value and the yaw rate magnitude is greater than a third predetermined value; and
   changing the third indication of direction, only upon the further conditions that the steering angle magnitude is greater than the second predetermined value and the yaw rate magnitude is greater than the third predetermined value.

9. The method of claim 2, further comprising the steps of:
   assigning one or more sign values to one or more of the first, second, or third indications of direction; and
   storing the one or more sign values for subsequent use in one or more control algorithms.

10. A program product for controlling for improper installation of sensors of a vehicle, the program product comprising:
    (a) a program configured to at least facilitate:
        determining whether the vehicle is moving forward;
        determining a first indication of direction based at least in part on a yaw value;
        determining a second indication of direction based at least in part on a steering angle value;
        determining whether the first indication of direction and the second indication of direction are inconsistent with one another; and
        changing the second indication of direction, if it is determined that the first indication of direction and the second indication of direction are inconsistent with one another, provided further that the vehicle is moving forward; and
    (b) a computer-readable signal bearing media bearing the program.

11. The program product of claim 10, wherein the program is further configured to at least facilitate:
   determining a third indication of direction based at least in part on a lateral acceleration value; and
   changing the third indication of direction, if the first indication of direction and the third indication of direction are inconsistent with one another.

12. The program product of claim 11, wherein the program is further configured to at least facilitate:
   determining whether the first indication of direction and the second indication of direction are inconsistent with one another by determining whether the first indication of direction indicates that the vehicle is turning in one direction while the second indication of direction indicates that the vehicle is turning in another direction; and
   determining whether the first indication of direction and the third indication of direction are inconsistent with one another by determining whether the first indication of direction indicates that the vehicle is turning in one direction while the third indication of direction indicates that the vehicle is turning in another direction.

13. The program product of claim 11, wherein the program is further configured to at least facilitate:
   changing the third indication of direction, only upon the further condition that the vehicle is moving forward.

14. A system for controlling for improper installation of sensors of a vehicle, the system comprising:
   an inertial sensor unit configured to at least facilitate generating a yaw value;
   a steering angle sensor unit configured to at least facilitate generating a steering angle value; and
   a control unit configured to at least facilitate:
      determining whether the vehicle is moving forward;
      determining a first indication of direction based at least in part on the yaw value;
      determining a second indication of direction based at least in part on the steering angle value; and
      determining whether the first indication of direction is inconsistent with the second indication of direction;
      changing the second indication of direction, if it is determined that the first indication of direction and the second indication of direction are inconsistent with one another, provided further that the vehicle is moving forward.

15. The system of claim 14, wherein:
   the inertial sensor unit is further configured to at least facilitate generating a lateral acceleration value; and
   the control unit is further configured to at least facilitate:
      determining a third indication of direction based at least in part on the lateral acceleration value; and
      changing the third indication of direction, if the first indication of direction and the third indication of direction are inconsistent with one another.

16. The system of claim 15, wherein the control unit is further configured to at least facilitate:
   determining whether the first indication of direction and the second indication of direction are inconsistent with one another by determining whether the first indication of direction indicates that the vehicle is turning in one direction while the second indication of direction indicates that the vehicle is turning in another direction; and
   determining whether the first indication of direction and the third indication of direction are inconsistent with one another by determining whether the first indication of direction indicates that the vehicle is turning in one direction while the third indication of direction indicates that the vehicle is turning in another direction.

17. The system of claim 15, wherein the control unit is further configured to at least facilitate:
   changing the third indication of direction, only upon the further condition that the vehicle is moving forward.

* * * * *